Jan. 14, 1930.　　　　G. COOPER　　　　1,743,117
FILTER PRESS
Filed April 3, 1929
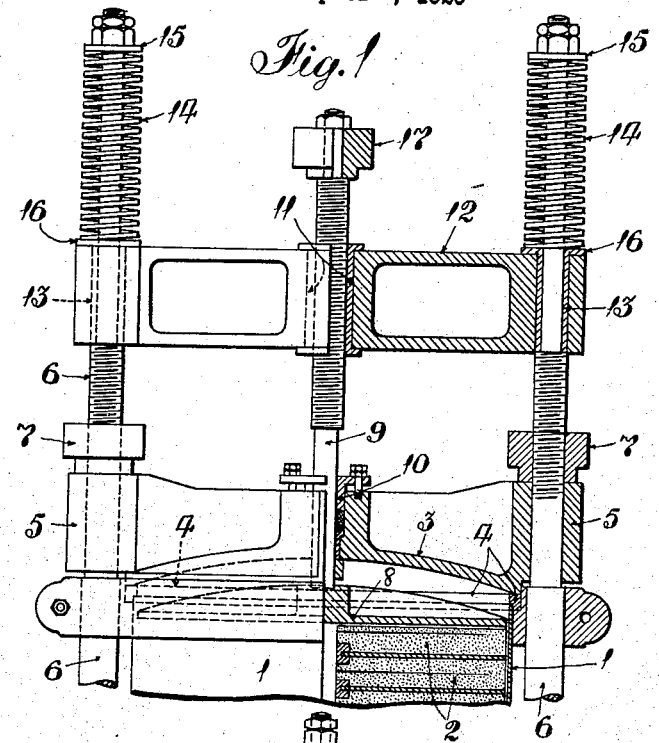
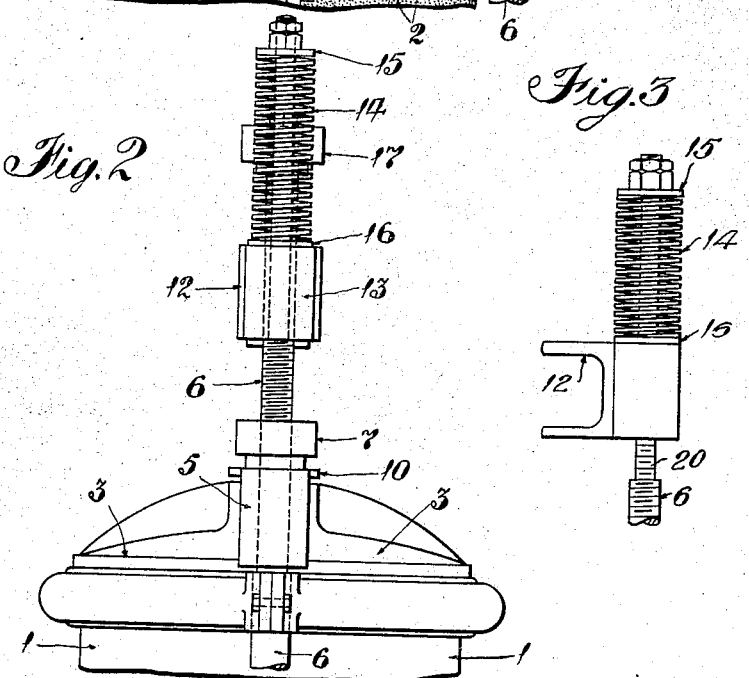
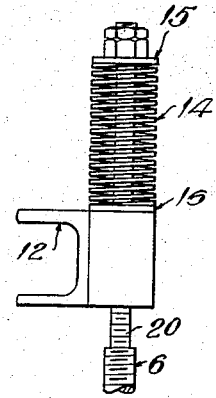

Patented Jan. 14, 1930

1,743,117

UNITED STATES PATENT OFFICE

GEORGE COOPER, OF LEEDS, ENGLAND, ASSIGNOR TO JOSHUA TETLEY & SON, LIMITED, OF LEEDS, ENGLAND

FILTER PRESS

Application filed April 3, 1929, Serial No. 352,280, and in Great Britain April 3, 1928.

This invention relates to filter presses more particularly of the type wherein the filtering medium comprises slabs or cakes superposed in a chamber or vessel closed at the top by a cover and in which an additional floating cover plate is fitted on or over the last slab or cake placed in the press and adapted to be adjusted to exert greater or less pressure on the slabs or cakes by means of a threaded rod passing through a stuffing box on the press cover and into engagement with a nut.

According to the invention the nut of the adjusting screw is mounted in a crosshead, the extremities of which take over screws for receiving the press cover, said latter screws being extended to receive pressure springs arranged to bear on the crosshead in such a manner that the pressure on the floating cover plate may be predetermined.

In order that the invention may be clearly understood and readily carried into effect, the same will now be more fully described with reference to and by the aid of the accompanying drawings; wherein:—

Figures 1 and 2 are a part sectional front elevation and a part side elevation of a filter press according to the invention.

Figure 3 is a detail view showing a means for indicating the compression of the pressure springs.

Referring to the drawings, 1 is the filter chamber containing the superposed slabs or cakes 2 constituting the filtering medium, said chamber 1 being closed at the top by a cover 3 with its edges or periphery resting on a rubber ring or gasket 4 fitted in a recess provided at the upper edge of the chamber 1, the cover 3 being formed with diametrically opposed bearings 5 which receive vertical fixed screws 6 provided with nuts 7 whereby the cover may be screwed down on to or over the uppermost slab or cake 2. An additional floating cover plate 8 is placed on or over the uppermost slab or cake 2 in the press, and said floating cover plate 8 has associated with it a rod or adjusting screw 9 passing through a stuffing box 10 on the cover 3 and through a nut 11 in a crosshead 12, the extremities of which are fitted with sleeves or bushes 13 which surround plain extensions of the vertical screws 6. The upper ends of the plain extensions of the vertical screws 6 carry helical pressure springs 14 mounted thereon between fixed heads or collars 15 and flanges 16 on the sleeves or bushes 13, while the upper end of the threaded rod 9 is provided with a head 17 for manipulating purposes. By appropriate actuation of the rod 9 the pressure on the slabs or cakes 2 in the press chamber 1 may be adjusted without interfering with the necessarily close fitting of the cover 3. As shown in Fig. 3 suitable recording or indicating graduation marks 20 may be furnished for showing the amount of compression of the springs 14 as pressure is applied through the threaded rod 9 to the floating cover plate 8 on the slabs or cakes 2, and in this connection the springs 14 may be so designed that the compression in length of each spring 14 is directly proportional to the pressure applied so that the pressure exerted for any particular adjustment is predetermined.

Claims:—

1. In a filter press of the character referred to, the combination of a casing, guides rising from the casing, a crosshead loosely engaging said guides, pressure springs bearing on said crosshead, a pressure plate within the casing and a screw rod bearing on said plate and having threaded engagement with the crosshead, whereby by turning the rod the crosshead may be adjusted longitudinally of its guides to vary the pressure exerted on the plate by the springs, as desired.

2. In a filter press of the character referred to, the combination of a casing, guides rising from the casing, a crosshead loosely engaging said guides, pressure springs bearing on said crosshead, a pressure plate within the casing, and a screw rod bearing on said plate and having threaded engagement with the crosshead, whereby by turning the rod the crosshead may be adjusted longitudinally of its guides to vary the pressure exerted on the plate by the springs, graduations being provided on the guides to cooperate with the crosshead to indicate the extent of compression of the springs.

3. In a filter press, the combination of a casing, guide rods rising from the casing, a cover for the casing, nuts engaging threads on the guide rods for holding the cover in place on the casing, a crosshead having sleeves adapted to extend around the threaded portions of said guide rods and having flanges at their upper ends, pressure springs surrounding the guide rods and bearing against the flanges on the sleeves in the crosshead, a pressure plate within the casing, and a screw rod bearing on said plate and having threaded engagement with the cross-head, substantially as and for the purpose described.

GEORGE COOPER.